US006456709B1

(12) United States Patent
Cox et al.

(10) Patent No.: US 6,456,709 B1
(45) Date of Patent: *Sep. 24, 2002

(54) METHOD AND APPARATUS FOR MONITORING TELEPHONIC MEMBERS AND PROVIDING DIRECTORY ASSISTANCE

(75) Inventors: Patrick M. Cox, Tigard; A. Peter Powell, Colton; Paul W. Filliger, Silverton; Michael A. Kepler, Aloha; Christopher A. Huey, Banks, all of OR (US)

(73) Assignee: Metro One Telecommunications, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,921

(22) Filed: Mar. 13, 1997

(51) Int. Cl.[7] .................... H04M 1/64; H04M 3/42; H04M 3/00
(52) U.S. Cl. .................... 379/218.01; 379/67.1; 379/88.18; 379/88.17; 379/201.01; 379/202.01; 379/214.01; 379/265.01
(58) Field of Search .................. 379/67.1, 157, 379/201, 218, 260–267, 308, 309, 321, 100.05, 185, 34, 69, 77, 82, 88.17, 88.18–88.21, 113, 114, 213, 214; 455/404, 416, 414, 417, 412, 413

(56) References Cited

U.S. PATENT DOCUMENTS

| | | | |
|---|---|---|---|
| 837,894 A | 12/1906 | Aven | |
| 4,696,028 A | 9/1987 | Morganstein et al. | 379/88.24 |
| 4,817,129 A * | 3/1989 | Riskin | 379/88 |
| 4,908,850 A | 3/1990 | Masson et al. | 379/88.26 |
| 4,922,519 A * | 5/1990 | Daudelin | 379/67 |
| 4,932,042 A | 6/1990 | Baral et al. | 379/67 |
| 4,959,855 A | 9/1990 | Daudelin | 379/213 |
| 4,979,206 A * | 12/1990 | Padden et al. | 379/67 |
| 5,056,134 A | 10/1991 | Bauer et al. | 379/246 |
| 5,063,591 A * | 11/1991 | Jodoin | 379/115 |
| 5,157,718 A * | 10/1992 | Kaplan et al. | 379/218 |
| 5,163,083 A * | 11/1992 | Dowden et al. | 379/88 |
| 5,181,237 A * | 1/1993 | Dowden et al. | 379/88 |
| 5,187,740 A | 2/1993 | Swaim et al. | 379/209 |
| 5,222,120 A * | 6/1993 | McLeod et al. | 379/88.24 |
| 5,353,336 A | 10/1994 | Hou et al. | 379/67 |
| 5,414,754 A | 5/1995 | Pugh et al. | 379/88.23 |
| 5,418,844 A * | 5/1995 | Morrisey et al. | 379/207 |
| 5,479,488 A * | 12/1995 | Lennig et al. | 379/67 |
| 5,511,111 A | 4/1996 | Serbetcioglu et al. | 379/88.01 |
| 5,517,560 A | 5/1996 | Greenspan | 379/114 |
| 5,689,547 A * | 11/1997 | Molne | 379/58 |
| 5,737,700 A * | 4/1998 | Cox et al. | 455/414 |
| 5,768,513 A * | 6/1998 | Kuthyar et al. | 395/200.34 |
| 5,797,092 A * | 8/1998 | Cox et al. | 455/404 |
| 5,850,433 A * | 12/1998 | Rondeau | 379/201 |

* cited by examiner

*Primary Examiner*—Allan Hoosain
(74) *Attorney, Agent, or Firm*—Kaye Scholer LLP

(57) ABSTRACT

Telephone users desiring directory assistance services are connected via standard telephone procedures to a directory assistance provider, such as an operator. An operator provides the destination number and initiates a connection to that number. Once that connection is initiated, the connection is monitored for the occurrence of a predetermined condition, such as a busy signal. If no such condition is detected, the caller proceeds with the call in the normal manner. If, however, such a condition is detected, the caller is automatically transferred to a directory assistance provider for further help.

62 Claims, 8 Drawing Sheets

METHOD AND APPARATUS FOR MONITORING TELEPHONIC MEMBERS AND PROVIDING DIRECTORY ASSISTANCE

BACKGROUND OF THE INVENTION

1. Technical Field

The present invention relates to a system for providing directory assistance services to telephone users in a telephone network and, in particular, maintaining a connection to a directory assistance platform and providing for automatic reconnection to a directory assistance provider.

2. Discussion of the Related Art

Telephone calls from one party to another are made through telephone networks, with telephone switches and private branch exchanges ("PBX") employed as necessary in order to connect networks and customers. Customers frequently make use of directory assistance systems to reach their desired parties. When using a directory assistance system (sometimes referred to as a "directory assistance platform"), a caller first dials the appropriate telephone number or access code. Telephone users usually access a directory assistance system through a carrier switching center. Once connected to a directory assistance provider, such as a live operator or a voice server, the caller identifies the party whose telephone number is desired. The correct number is located and may be reported to (by voice or computer-generated speech), and/or dialed for, the caller. It is increasingly common for directory assistance systems to connect the caller to the caller's desired number in addition to, or in place of, simply providing the number to the caller. This is particularly helpful to callers using cellular or other forms of wireless telephones, who may be engaged in other activities at the same time and therefore unable to take note of the number as it is recited. Typically, once the caller has been given the number and/or the number is dialed for the caller, the caller's connection through the directory assistance platform is terminated.

Termination of the connection through the directory assistance platform has a number of disadvantages. For example, if the caller is given or connected to an incorrect telephone number, the caller must contact the directory assistance system again or inquire elsewhere to obtain the correct number. This naturally requires additional action and expense on the caller's part. Moreover, reconnection to the directory assistance platform requires reallocation of directory assistance resources to the customer call. In view of the previous connection through the directory assistance platform, reconnection and reallocation is unnecessary, time consuming, and under some circumstances, wasteful. Similarly, even if the telephone number to which the caller is connected is correct, the line may be busy, there may be no answer, the destination party is telephone network may be inoperable, etc. In such circumstances, the caller often will want to contact a different party, again requiring the aid of the directory assistance system. Requiring separate and repeated connections to a directory assistance platform incurs added monetary expense on the caller's part, because directory assistance platforms typically charge a fee for each separate connection. Conversely, if a caller's connection is maintained to the directory assistance platform, multiple actions may be taken to assist the caller without necessarily incurring such additional fees.

It is known in the art to provide proactive call services to calling and/or called parties. As demonstrated in U.S. Pat. No. 5,414,754, proactive call services allow parties to, for example, establish a conference call to a third party, leave recorded messages for an unavailable called party, or instruct a telephone service provider to repeatedly attempt to connect to an unavailable party for a pre-determined period of time after an unsuccessful call attempt. Most proactive call services are provided only when a call has been successfully established between two (or more) parties. For such call services, one of the parties requests the service by entering a specified access code. Other proactive call services are available only when a call is unsuccessful (e.g., the caller encounters a busy signal or a ring-no-answer condition); to access these services, the caller is prompted to select one from a menu. Both methods suffer the disadvantage of requiring affirmative action by one or more parties in order to access the services.

Prior art directory assistance systems suffer from a further disadvantage in that they typically lack dedicated resources for monitoring telephone connections to calling or called parties. For example, in U.S. Patent No. 5,414,754, one tone detecting device monitors up to 1,344 connections by using a multiplexer. The period of time for which each connection is monitored is critical to this method of operation. To service so many connections on an equal time-sharing basis, the device cannot monitor one particular connection for more than a very short period of time (illustratively, on the order of milliseconds) before switching to and monitoring others. If the time period is too short, this method has the deleterious effect of requiring a party to press a key for an extended period of time—long enough to ensure that the monitoring digital signal processor ("DSP"), perhaps a dual-tone multi-frequency ("DTMF") receiver, cycles back to the party's connection in time to detect the keypress—or risk the possibility that the DSP will miss the party's keypress. Another disadvantage to this method is that normal voice energy, or transient signals such as from interference or crosstalk, may cause a DSP that is monitoring the connection to mistakenly report that a party pressed a key. This disadvantage is even more pronounced in a wireless environment, where the bit error rate or degraded audio quality of the connection often precludes the receipt of a continuous tone.

Another disadvantage in prior directory assistance systems is the inability to restrict the caller's use of the directory assistance system to connect to specified parties. For example, the party paying for a caller's wireless telephone service may wish to restrict the caller from making any long-distance calls, or to limit the caller to calls to other parties within one organization, etc. Without the ability to limit the caller's connections through the directory assistance system, the caller could circumvent the paying party's restrictions by having the directory assistance system complete the call for him or her.

Accordingly, there is a need in the art to provide a method and apparatus by which a caller can, for the duration of a telephone call (i.e., until the calling telephone disconnects from the directory assistance platform), maintain his or her connection to the directory assistance platform and repeatedly receive directory assistance in a variety of forms with minimal or no action on his or her part. There is also a need in the art for means and an apparatus for allocating a monitoring resource, such as a DSP, to a minimal number of telephonic connections. In addition, there is a need for means and an apparatus for verifying a caller's authorization to connect to a requested destination party through a directory assistance platform.

SUMMARY OF THE INVENTION

In view of the above disadvantages of the related art, it is an object of the present invention to provide a method and apparatus for maintaining a telephonic connection for the duration of a telephone call through a directory assistance platform (i.e., until the calling telephone disconnects from the platform) and automatically reconnecting a directory assistance-routed caller to a directory assistance provider.

It is a further object of the present invention to detect, during a call to a customer's destination party, a telephone network communication problem that causes the call to be unsuccessful, and to connect the caller, with substantially no further action on his or her part, to a live operator for further assistance.

It is another object of the invention to detect a ring-no-answer condition while attempting a call to a customer's destination party, and, upon such detection, to maintain the connection attempt and present the caller with a menu of directory assistance service options, including the option to continue monitoring the ring tone.

It is a further object of the invention to detect a busy signal while attempting a call to a customer's destination party, and, upon such detection, to terminate the connection attempt and present the caller with a menu of directory assistance service options, including the option to re-dial the same number.

It is also an object of the invention to provide a method and apparatus for providing directory assistance services, such as connecting customers to directory assistance providers, allowing repeated directory assistance requests from each customer, searching for information to satisfy directory assistance requests, providing such information to customers, and connecting customers to their desired destination parties, as well as enhanced directory assistance services, e.g., recording messages from customers for delivery to destination parties and allowing destination parties, upon delivery of a recorded message, to return the customer's call with minimal action by the destination party.

It is a further object of the invention to verify a customer's authorization to complete calls through a directory assistance system. To enable such verification, along with the customer's call, data concerning the calling telephone number and the location from which the call originated is also received. Based upon the caller's identity and stored information concerning restrictions on the customer's calling authority, the caller's authorization for connecting to desired destination parties can then be verified.

It is a still further object of the invention to provide a directory assistance customer with numerous opportunities to request, with minimal action on the customer's part, the directory assistance system to report the desired destination telephone number.

It is also an object of the invention to provide a directory assistance customer with the customer's destination telephone number via the customer's alphanumeric pager.

It is a still further object of the invention to implement the above objects for callers using wireless telephones.

In accordance with the present invention, a directory assistance system is provided that includes a telephone switch or PBX for receiving, establishing, routing, and connecting telephone calls, plus telephone operators, communication links to physically connect the directory assistance system components, and one or more computers, including at least one voice server, to perform a variety of directory assistance functions (e.g., maintain and search databases containing telephone numbers, billing information, call information, etc.; store and execute instructions relating to the operation of the switch or PBX; provide automated voice services and operator functions). Providing access to and from the telephone switch are external communication links that support standard T1, Common Channel Signalling System 7 ("CCSS7"), or Integrated Digital Services Network ("ISDN") communications.

Calls into the directory assistance system and connections from the system to a caller's destination number are made over external communication links. Telephone connections over the communication links are monitored to detect keypresses and connection status conditions (e.g., busy signal, dial tone). For example, outbound connections to destination parties are monitored by call progress analyzers ("CPA") to determine if an attempted call is unsuccessful (e.g., a busy signal is detected); once applied, CPAs are allocated to the outbound connection for a period of time sufficient in length (illustratively determined by a specified number of rings of the destination telephone) to determine the success or failure of the connection attempt.

The directory assistance system does not drop its connection to, and involvement in, a calling party's connection as soon as it initiates a new call leg (i.e., an outbound call to a destination telephone). Rather, the directory assistance system maintains contact, ready to provide further assistance from a directory assistance operator or a voice server until the calling party disconnects from the directory assistance platform. By remaining in the call flow, a directory assistance system according to this invention is able to provide much faster response to customers' subsequent assistance needs than was heretofore available, which is of particular value to wireless customers who may be distracted by other events. In previous directory assistance systems, in which the system would terminate its involvement after the customer was given its desired telephone number or the directory assistance provider initiated a call attempt to the desired party, the customer was required to reconnect to the directory assistance system if additional assistance was desired.

In a directory assistance system according to the present invention, incoming directory assistance request calls are received by a telephone switch, which is controlled by a switch host computer, via an inbound member of the external communication links and routed to a directory assistance provider. The directory assistance provider may be either a live operator or a voice server that provides automated directory assistance. The switch host computer stores and updates information concerning the status of each active directory assistance call. In addition, a call record is created on a system server to store, for billing purposes, the history of the customer's call. After receiving a request from the caller, the directory assistance provider locates and retrieves the telephone number of the caller's desired destination party by searching directory assistance information stored on system servers. An outbound member of the communication links is seized in order to connect the caller to his or her party, and the destination telephone number is dialed over that outbound member. A dual-tone multi-frequency ("DTMF") receiver is applied to the inbound member to detect customer keypresses, which may represent pre-specified directory assistance requests. A call progress analyzer ("CPA") is applied to the outbound member for a period of time to monitor the member for any one of several pre-determined telephone call connection status conditions that indicate an unsuccessful call attempt. Upon detection of such a connection status condition, or when the called party disconnects, the caller is redirected to a directory assistance provider for further assistance.

BRIEF DESCRIPTION OF THE DRAWINGS

These and other features, aspects, and advantages of the present invention will become more readily apparent from the following detailed description, which should be read in conjunction with the accompanying drawings, in which.

DETAILED DESCRIPTION OF THE INVENTION

Figure 1:
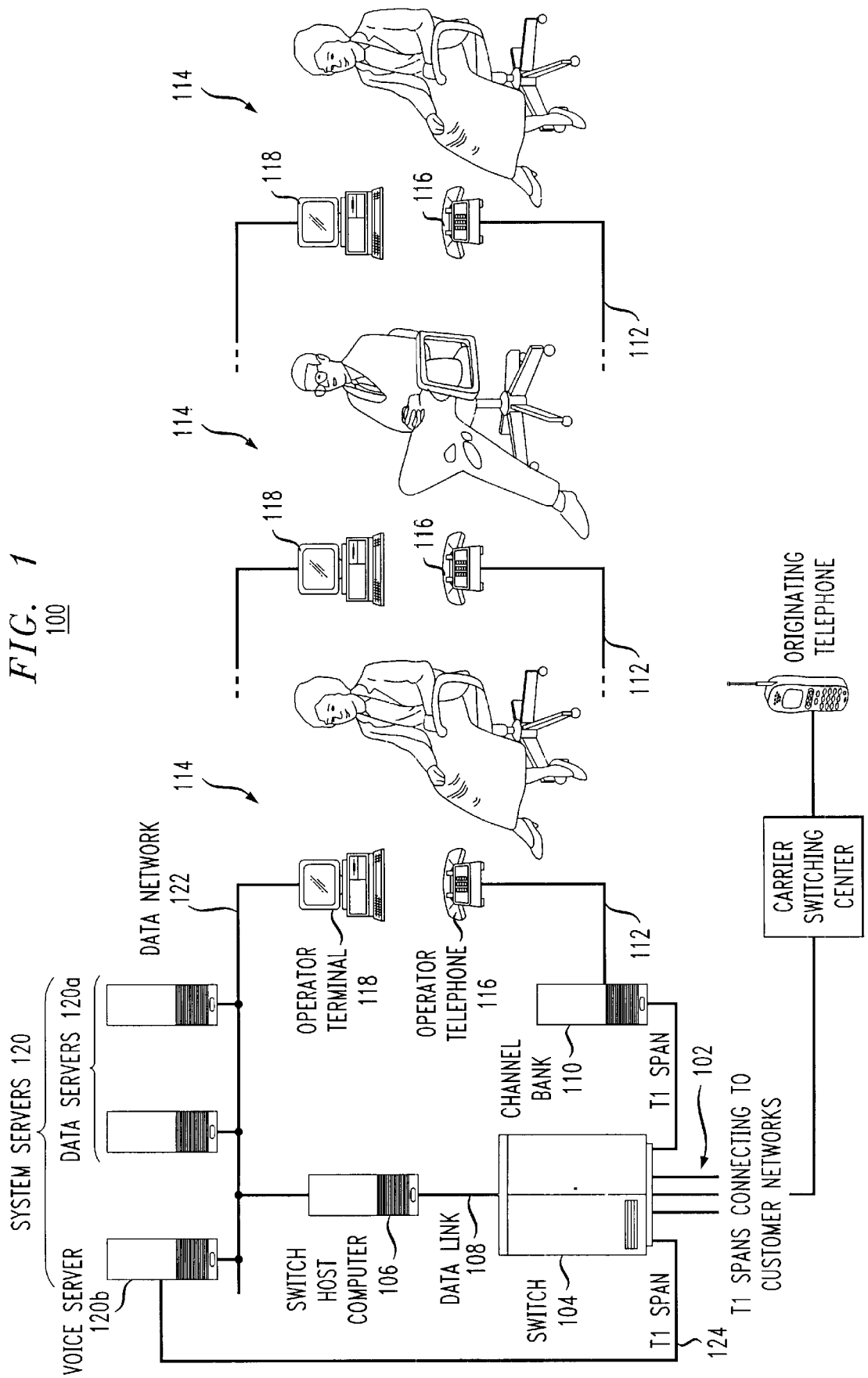
FIG. 1 depicts the components of a directory assistance system according to the invention.

The following embodiments will be described in the context of a private telephone switch connected via conventional T1 communication links to customers using wireless telephones. Those skilled in the art, however, will recognize that the disclosed methods and structures are readily adaptable for broader applications. Note that whenever the same reference numeral is repeated with respect to different figures, it refers to the corresponding structure in each figure.

With reference to FIG. 1, a directory assistance system 100 according to an exemplary embodiment of the invention is depicted. One or more external communication links 102 connect directory assistance system 100 to customers and customer telephone networks. Communication links 102 connect to telephone switch 104, which is connected to switch host computer 106 via switch data link 108. In an alternative embodiment, switch host computer 106 is coterminous with telephone switch 104.

Telephone switch 104 is attached via a T1 communication link to channel bank 110, and from there connects to operator channel 112 and operator telephone 116. Operator telephones are located at each of one or more operator positions (represented by the numeral 114 in FIG. 1). Using operator data terminal 118, a live operator at operator position 114 accesses one or more system servers 120, which are inter-connected via data network 122. Switch host computer 106 is also connected to data network 122. Finally, switch 104 is connected to one or more voice servers, which are described below. Each connection to a voice server employs a T1 voice server link (a first voice server link 124 is shown in FIG. 1).

As stated above, communication links 102 provide telephone connections to directory assistance system 100 for incoming directory assistance calls and also provide access to external telephone networks over which outgoing calls are placed. An incoming call is received via inbound channel 102a (shown in FIG. 2) and an outgoing call is placed over outbound channel 102b (shown in FIG. 2). There is generally one outbound channel 102b for every inbound channel 102a, so that for every call into directory assistance system 100 there is an outbound channel available to reach the caller's desired party or parties. Communication links 102 may, in an illustrative embodiment, be comprised of one or more T1 communication spans which are known in the art. In such an embodiment, each individual call over a T1 span, whether into or out of telephone switch 104, utilizes one of the 24 individual channels into which a T1 span is segmented, each channel providing two-way communication.

Figure 2:
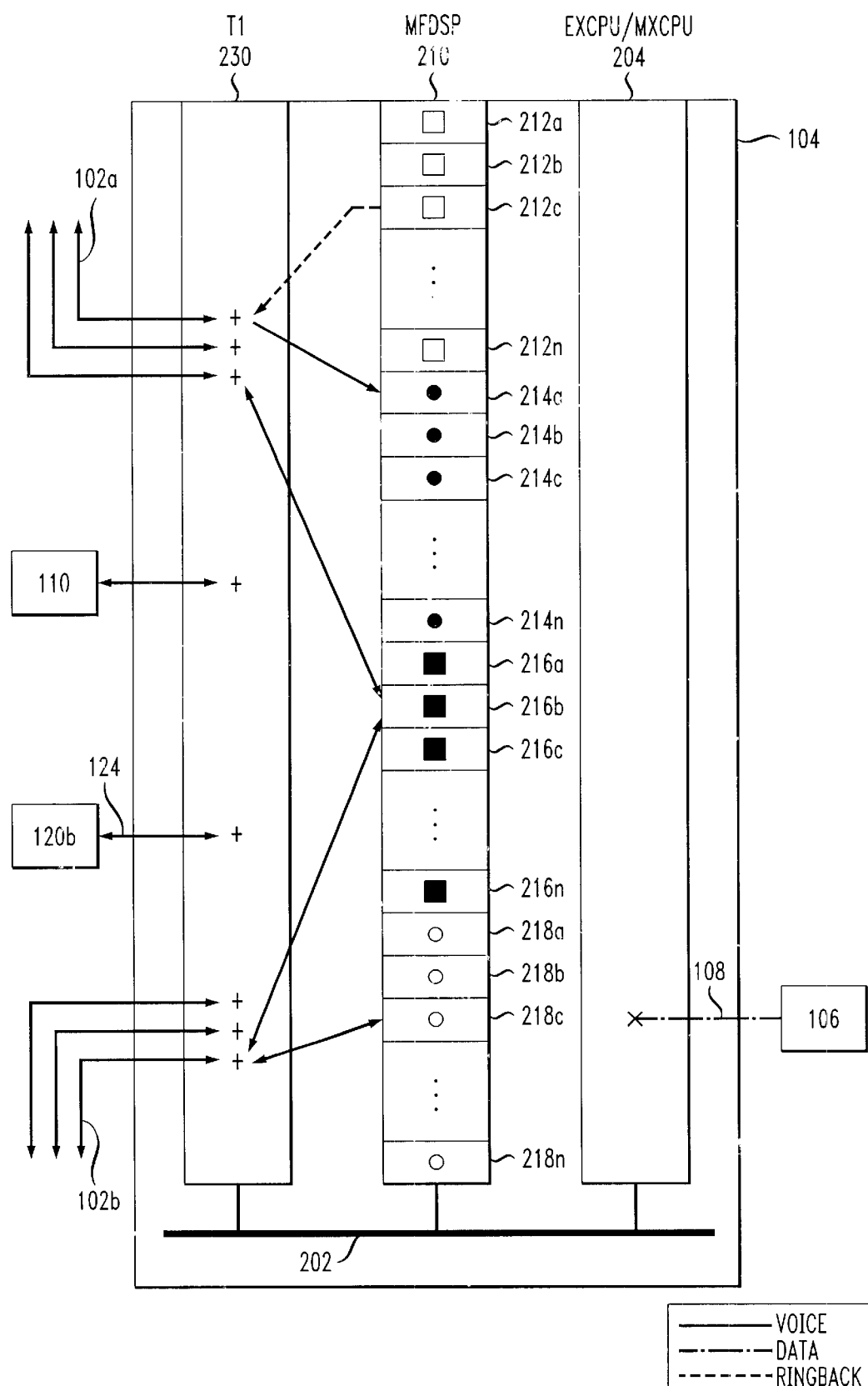
FIG. 2 provides a detailed view of a telephone switch used in one embodiment of the invention.

Telephone switch 104 is now described in further detail with reference to FIG. 2. Operation of telephone switch 104 is governed by computer-readable instructions stored and executed on switch host computer 106. In one embodiment of the invention, telephone switch 104 is an Excel LNX 2000 and switch data link 108 is a 38.4 kb serial link; in another embodiment, switch data link 108 is an Ethernet link.

Telephone switch 104 includes expandable central processing unit ("EXCPU") 204 and/or matrix central processing unit ("MXCPU") 204. EXCPU/MXCPU 204 serves as an interface for telephone switch 104 to switch host computer 106 (via switch data link 108).

EXCPU/MXCPU 204 and other components of telephone switch 104 communicate through shared communication path 202, commonly called a "midplane." In the currently-described embodiment, midplane 202 utilizes a time division multiplexing ("TDM") method of sharing a common pathway. Thus, a plurality of data and/or voice streams can be interlaced onto the single path, separated by time.

Another board-level component of telephone switch 104 is multi-frequency digital signal processor ("MFDSP") unit 210, which includes four single in-line memory module ("SIMM") packagings. Each SIMM packaging is comprised of four DSP arrays. Each DSP array is composed of multiple, illustratively sixteen, programmable DSPS. The DSPs can be programmed or reprogrammed to function as, among other things, call progress analyzers ("CPA"), call progress generators ("CPG"), multi-frequency ("MF") receivers or transmitters, dual-tone multi-frequency ("DTMF") receivers or transmitters, or conference units, depending upon the demand placed on directory assistance system 100 and telephone switch 104 for each corresponding function.

CPAs (represented by the numeral 218 in FIG. 2) are sensitive to, and capable of identifying, telephone connection status conditions and signals including ring tone, busy, reorder, PBX intercept, SIT intercept, vacant code, reorder-SIT, no circuit LEC, reorder-carrier, no circuitcarrier, dial tone, continuous on tone, and silence. In an exemplary embodiment of the invention, one CPA will monitor only one outbound channel 102b at a time. In other embodiments of the invention, one CPA may be applied to more than one outbound channel. However, to ensure that connection status conditions are properly detected, the number of outbound channels monitored by one CPA should be kept to a minimum (i.e., no more than four). In still other embodiments of the invention, two or more DSPs may be applied to a single outbound channel.

CPGs (represented by the numeral 212 in FIG. 2) generate tones to customers connected to directory assistance system 100, such as the ringback tone customers hear when they are routed to an operator.

DTMF receivers (represented by the numeral 214 in FIG. 2) listen for DTMF tones generated by customers' telephones, such as when a customer presses a telephone button. DTMF receivers are capable of detecting and identifying which button was pressed (i.e., the numbers 0–9 or the characters '*' or '#') and passing that information to switch host computer 106 for appropriate action. DTMF receivers are assigned to monitor inbound channels for a configurable period of time, illustratively, from the time of a caller's initial connection to telephone switch 104 to the time the caller disconnects, including the duration of all outbound call legs made on the caller's behalf. Once applied to an inbound channel, a DTMF receiver allows telephone switch 104 to detect the press of a telephone button, perhaps done in order to activate tone-triggered return transfer as described in pending U.S. Ser. No. 08/234,644 filed Apr. 28, 1994, which is incorporated herein by reference, or another feature of directory assistance system 100.

Conference units (represented by the numeral 216 in FIG. 2) enable telephone switch 104 to connect two or more voice paths in a balanced manner, thereby providing the necessary voice connections between calling parties, called parties, and directory assistance providers.

In the presently-described embodiment, each DSP array provides multiple instances of the function for which it is programmed, the exact number depending upon the specific function. For example, each DSP array programmed to provide CPA, CPG, or DTMF receiver functions provides sixteen instances of the chosen function. In other words, a DSP array programmed to provide call progress analyzer functions will contain sixteen separately and independently functional and controllable CPAs. A DSP array programmed to provide conference unit functions, however, provides only four instances of such function. The programmable DSPs on MFDSP unit 210 are managed by switch host computer 106 via EXCPU/MXCPU 204, which keeps track of which DSPs are available and which are allocated.

An additional board-level component of telephone switch 104 is Ti interface unit 230. Switch 104 contains one or more T1 interface units; each unit provides connections to eight T1 (1.544 mb/sec) spans, each of which is comprised of 24 channels, thus providing 192 64 kb voice channels per T1 interface unit. In FIG. 2, T1 interface 230 dedicates twelve channels on each of six of the eight spans to incoming calls and the other twelve to outgoing calls. The seventh T1 span serves as voice server link 124, and the eighth functions as a link to channel bank 110 and operator channel 112. Voice server link 124 and operator channel 112 are used to connect directory assistance callers to a voice server or a live operator, respectively.

It will be recognized by one skilled in the art that multiple instances of telephone switch 104 may be incorporated into a telephone network or directory assistance system 100 without exceeding the scope of this invention.

Switch host computer 106 stores and executes computer-readable instructions for the purposes of, among others, configuring and operating telephone switch 104 and directing the transfer of calls through switch 104. It also directs the playback of recorded messagesito callers connected to directory assistance system 100. Pre-recorded greeting and closing messages played for callers are recorded in the voice of the operator to whom the caller will be, or was, connected. Switch host computer 106 directs the playback of the appropriate message by identifying the operator and the inbound channel 102a the caller is connected to and specifying the message to be played.

Further, switch host computer 106 maintains call data for each directory assistance call connected to directory assistance system 100. The call data stored on the host computer consists of the most recent assistance request received from each caller, and includes one or more of: the calling telephone number, the date and time of the caller's connection to directory assistance system 100, the T1 span and channel the caller is connected to, the caller's desired destination telephone number, the status of the caller's previous directory assistance request, which operator assisted the caller, etc. Additional call data is stored on system servers 120, as described below. The call data stored on switch host computer 106 and system servers 120 are provided to directory assistance providers when a caller makes multiple directory assistance requests in one call to directory assistance system 100. By considering the collected call data, such as the information that was provided to a caller in a previous request, a directory assistance provider can tailor subsequent assistance to be more effective.

Switch host computer 106 also directs the transfer of information between itself and system servers 120 (via data network 122) as well as between system servers 120 and switch 104 and operator position 114 (via channel bank 110 and operator channel 112).

Operator position 114 includes means by which a live operator receives calls, determines callers' informational needs, searches for and retrieves information from system servers 120, provides information to callers, and initiates outgoing calls. In an exemplary embodiment of the invention, an operator at operator position 114 is provided with a telephone headset 116 for interacting with callers, and data terminal 118, connected to data network 122, for interacting with system servers 120.

System servers 120, which are interconnected via data network 122, include one or more data servers 120a which provide and manage data services within directory assistance system 100. Data servers 120a maintain databases containing telephone and business directories, billing information, and other information in computer-readable form to be searched by operators in response to callers' requests. As introduced above, data servers 120a also store call data for later retrieval by directory assistance providers furnishing subsequent assistance to a caller. The call data stored on data servers 120a illustratively include how and where a directory assistance provider searched for information to satisfy a customer request, the information retrieved by the assistance provider, how that information was displayed for the assistance provider, and the form in which it was communicated to the caller. Unlike switch host computer 106, data servers 120a save call data concerning all requests made by a caller during one call to directory assistance system 100, not just the most recent request, but only for a predetermined period of time (illustratively, one hour).

Billing information is stored in the form of call records, which are created for each customer call into directory assistance system 100. They contain data such as the caller's telephone number, the date and time of the caller's connection to directory assistance system 100, the dates and times of attempted connections to destination parties, the duration of each call leg, etc. A call record is updated each time directory assistance is rendered to the associated customer, and is closed when the customer disconnects from directory assistance system 100.

The software used to create and manipulate the databases on data servers 120a is known in the art of computer software and allows directory assistance providers to search the databases by name, address, type of goods or services, geographical region, etc. In FIG. 1, switch host computer 106 and data servers 120a are depicted as distinct entities; in an alternative embodiment they are coterminous.

System servers 120 also include one or more voice servers (a first voice server 120b is shown in FIG. 1) that provide, in alternative embodiments of the invention, all or a subset of the operator functions provided by a live operator at operator position 114. For example, voice servers store and deliver messages that live operators would otherwise be required to frequently repeat for callers, such as greetings, closing messages, and the caller's requested telephone number.

Figure 3:
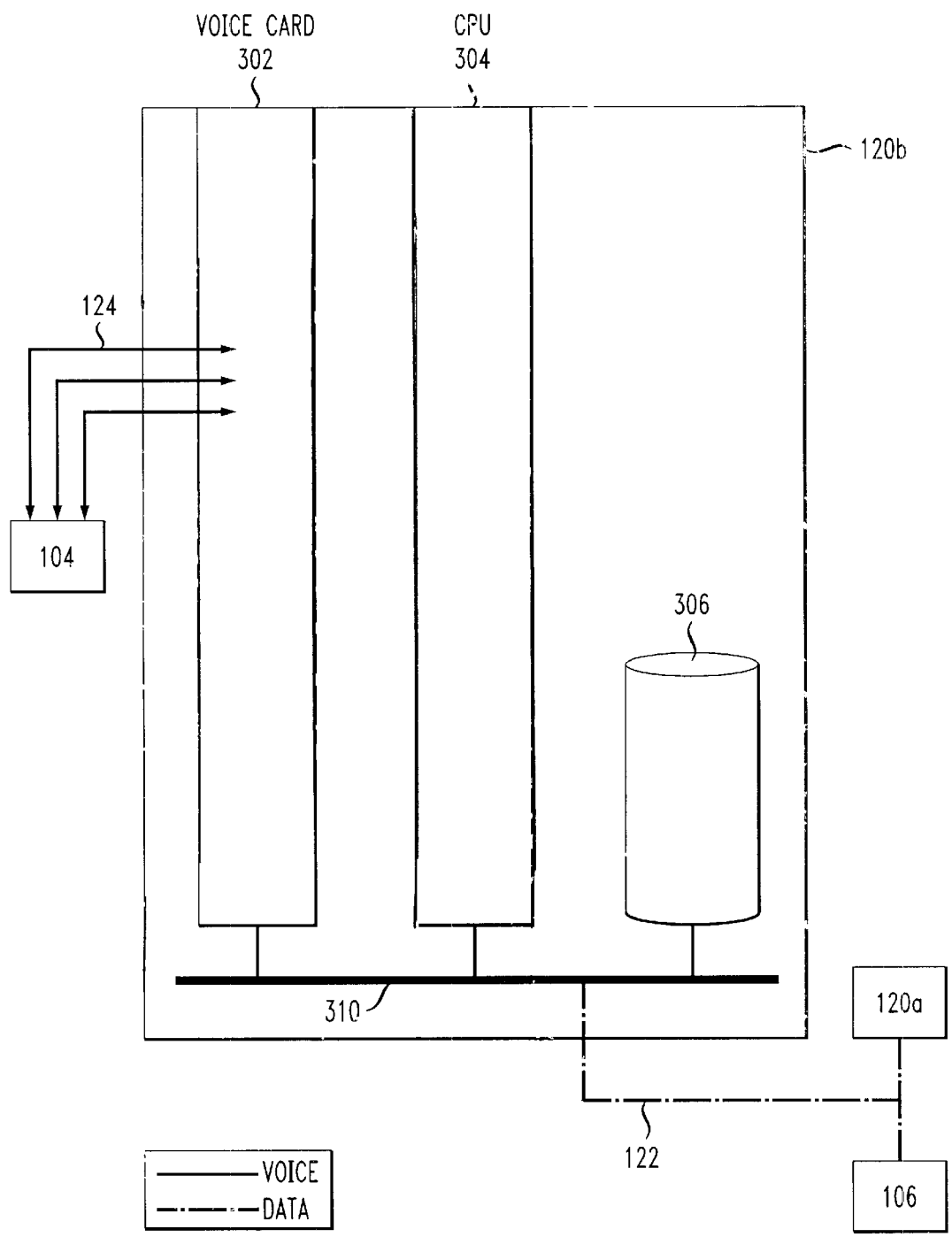
FIG. 3 provides a detailed view of a voice server used in one embodiment of the invention.
Figure 4A:
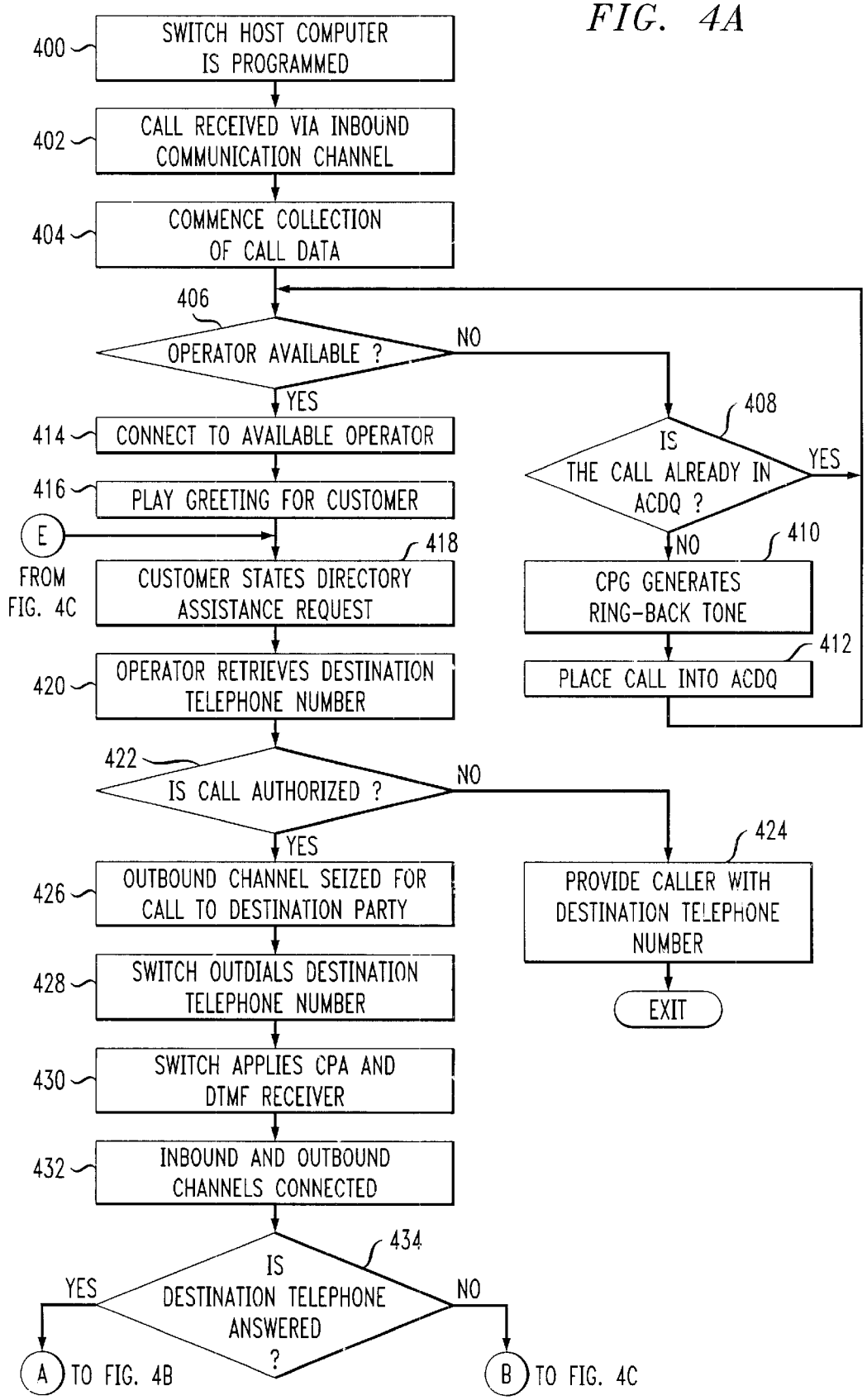
FIGS. 4A–E are flowcharts depicting one method of using the invention.
Figure 4B:
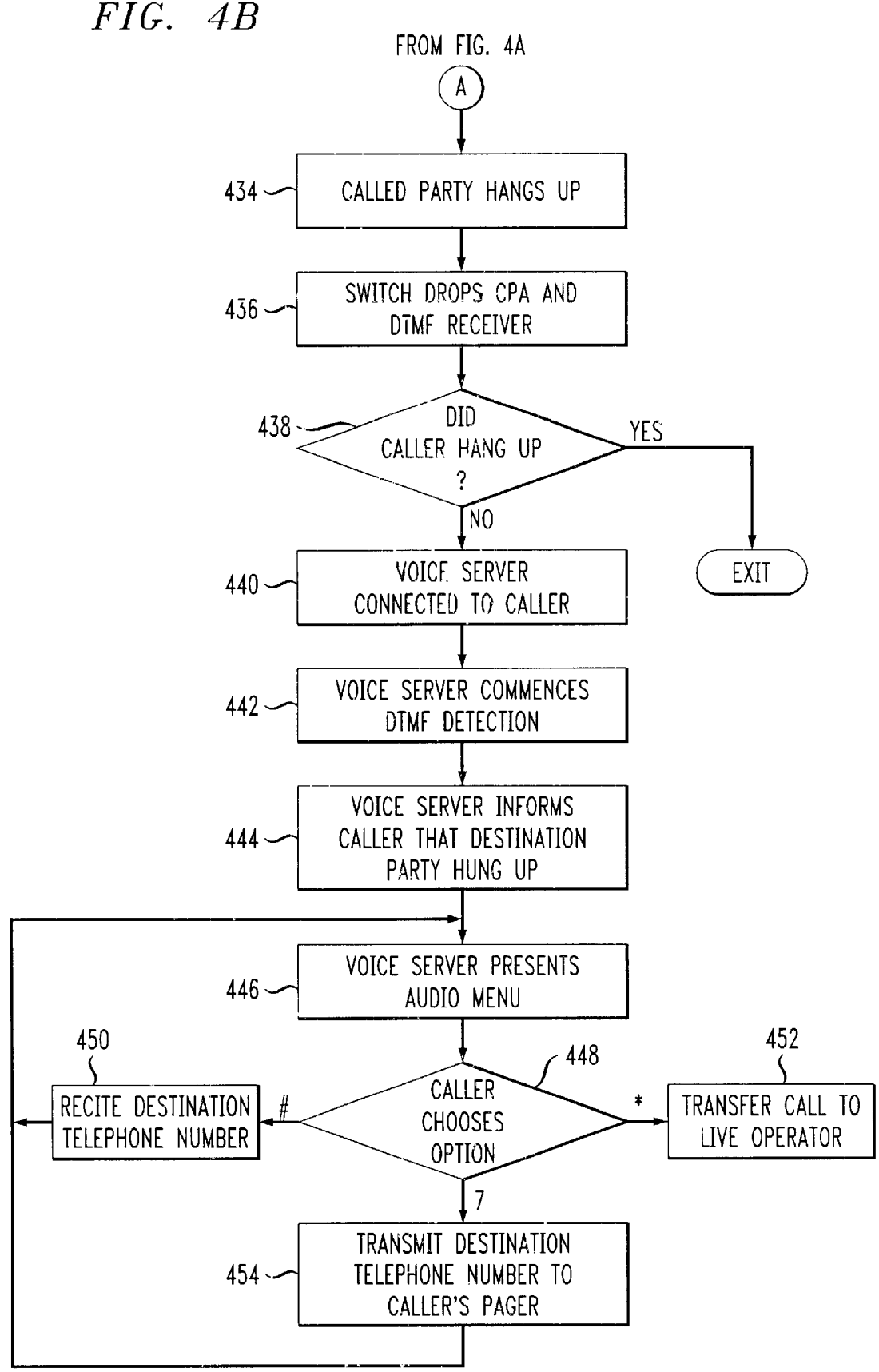
Figure 4C:
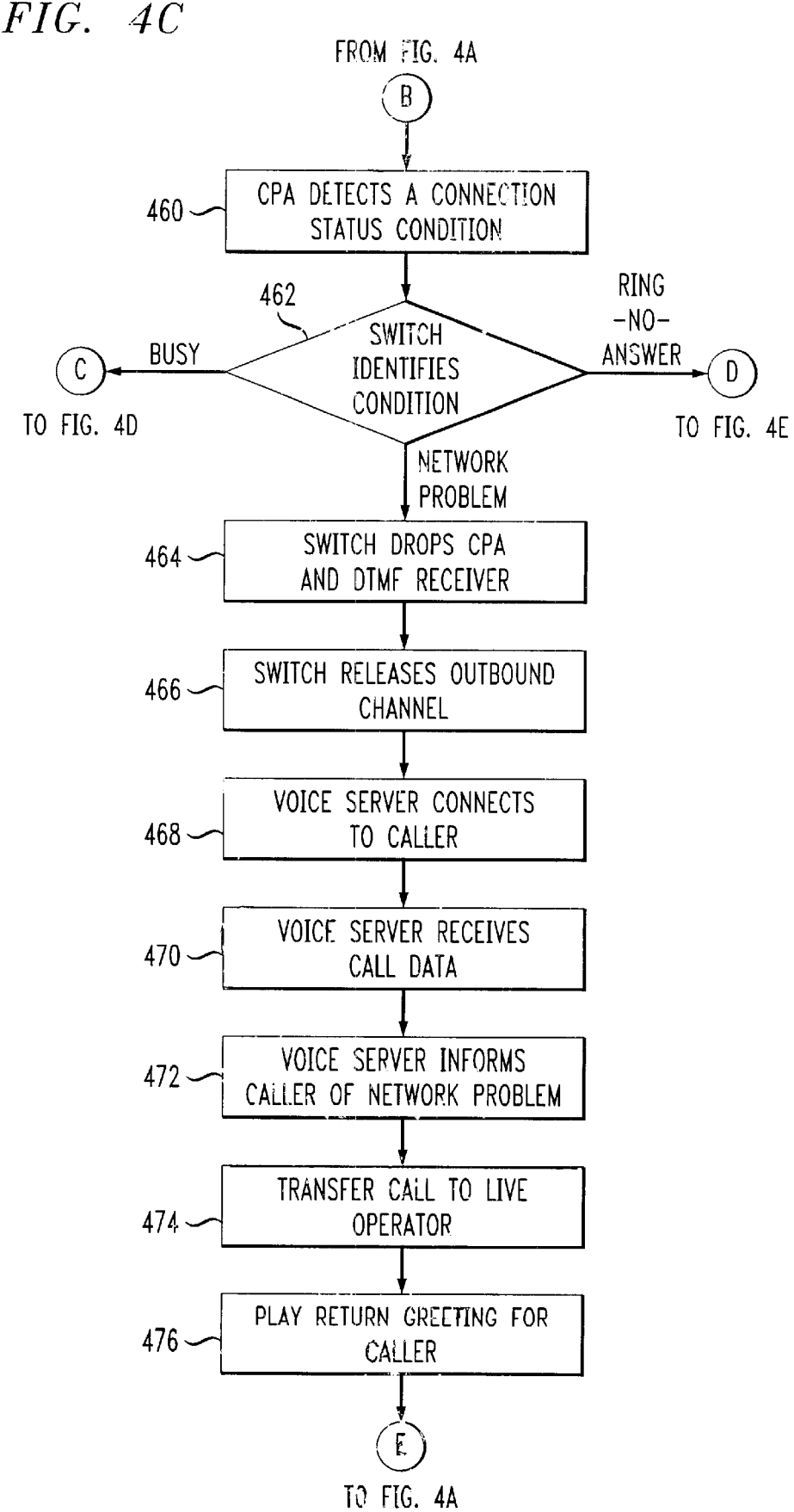
Figure 4D:
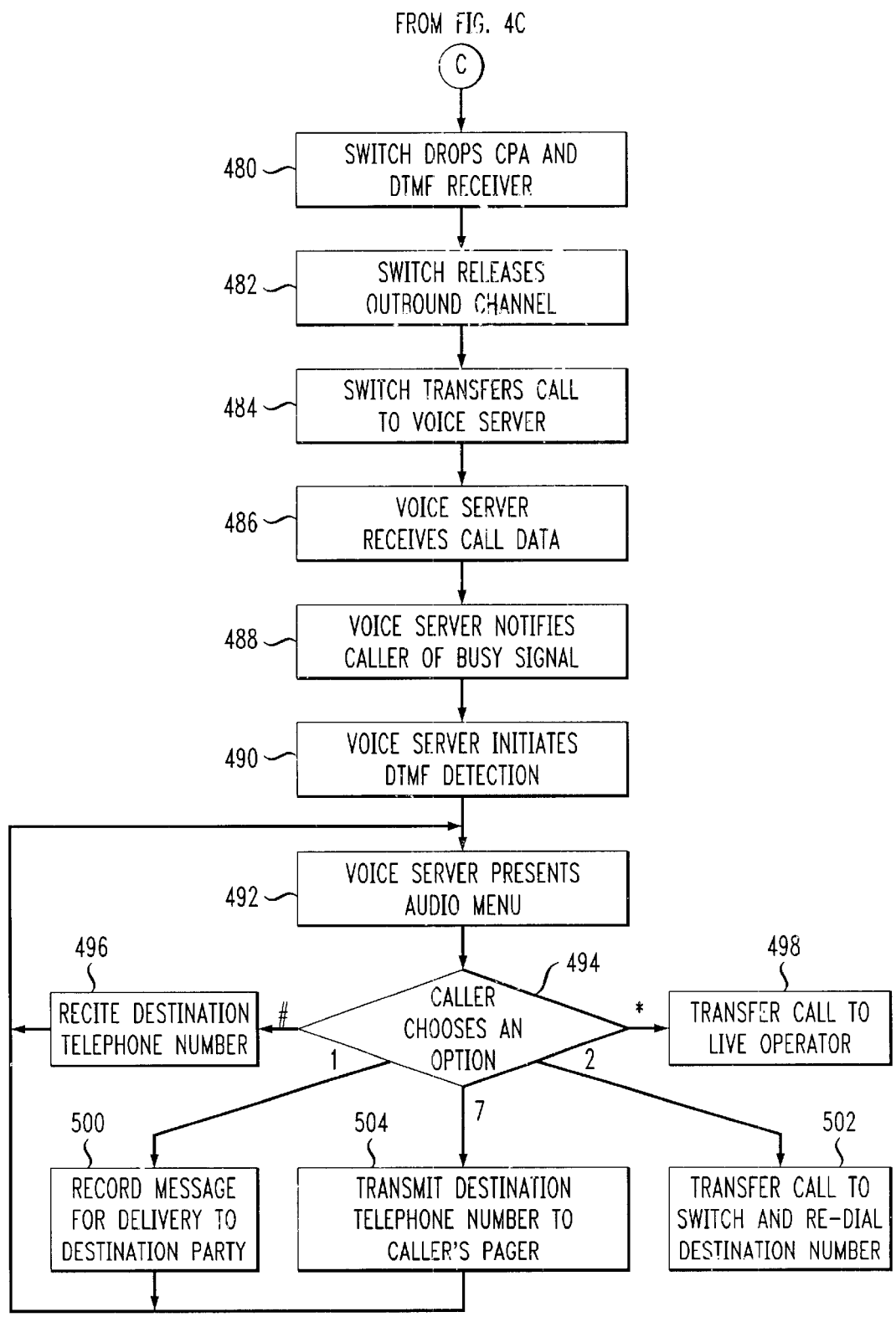
Figure 4E:
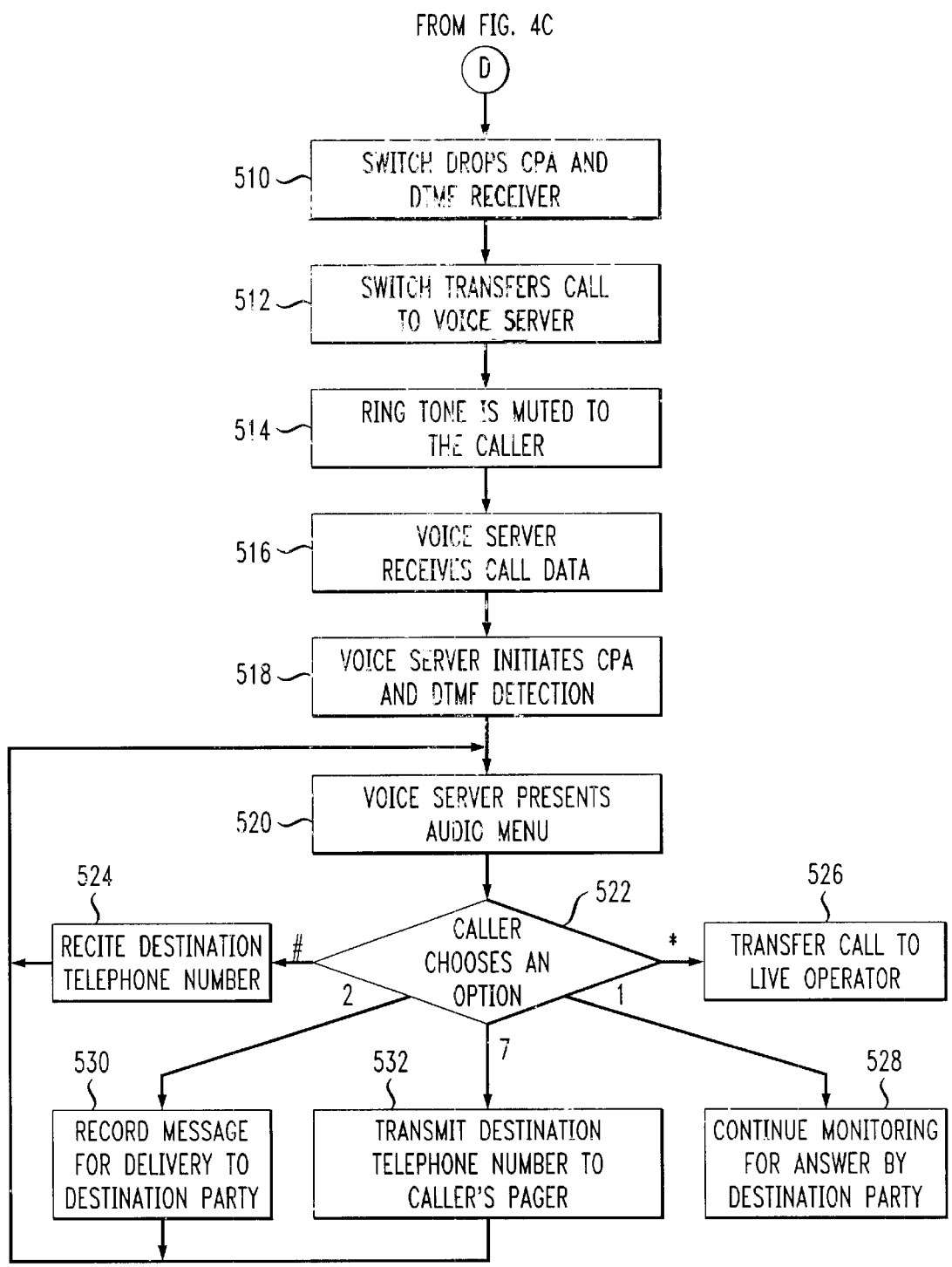

In an illustrative embodiment, depicted in FIG. 3, voice server 120b is connected to telephone switch 104 by voice server link 124 and to switch host computer 106 and data servers 120a via data network 122. Each voice server connects to telephone switch 104 via a separate voice server link voice server 120*b* consists of a general purpose computer plus one or more voice cards (a first voice card 302 is depicted in FIG. 3), which serve as the interface between voice server link 124 and voice,server 120*b*. Voice card 302 monitors and controls communications over voice server link 124; its capabilities include telephone tone detection and generation, voice recording and playback, and call progress analysis. Therefore, very similar to telephone switch 104, voice server 120*b* is capable of detecting connection status conditions, detecting customer keypresses, and generating tones. Although FIG. 1 depicts voice server 120*b* distinct from data servers 120*a,* in alternative embodiments they are coterminous.

Voice server 120*b* also includes typical computer components such as central processing unit 304, data storage unit 306, and bus 310 for transferring voice and data signals. Voice server 120*b* may also contain a voice recognition subsystem (not shown) for receiving verbal input from a party connected to the voice server.

Voice server link 124 provides voice connections between telephone switch 104 and voice server 120*b,* thus providing means by which callers may be connected to voice server 120*b* and receive automated operator assistance. Voice server link 124, in an illustrative embodiment of the invention, is comprised of one or more T1 spans, with each one of the 24 channels of each span providing two-way communication.

Advance Directory Assistance Services

When, as described below in connection with one method of implementing this invention, the caller is connected to voice server 120*b* after a busy signal or a ring-no-answer condition is detected, subsequent monitoring of inbound channel 102*a* and outbound channel 102*b* is performed by voice server 120*b;* switch 104 continues to monitor outbound channel 102*b* to detect, for example, when the destination telephone is answered or disconnected. As mentioned above, voice server 120*b* contains voice card 302 which provides telephone signal detection and generation capabilities comparable to those of telephone switch 104. By drawing upon these capabilities, directory assistance system 100 can offer advanced directory assistance services to callers. Three services are of particular value, and directory assistance system 100 can be configured to automatically offer all, or a subset, of the three services to callers who encounter a busy signal or a ring-no-answer condition after the directory assistance system attempts to connect them to their destination parties.

The first service of particular interest serves to inform the caller of the telephone number retrieved in response to the caller's directory assistance request. Illustratively, the caller will press the '#' key to invoke this service. In response, voice server 120*b* conveys a verbalization of each digit in the telephone number. Alternatively, the caller may press another key, such as the '7' key, to receive the destination telephone number via his or her alphanumeric pager. One method by which directory assistance system 100 may deliver the destination telephone number to the caller's pager is by formatting a message containing the information to be provided, sending the message to a paging server maintained by the customer's service carrier, from whence it is sent across the carrier's paging network to the customer. The message may, alternatively, be received on another alphanumeric communication device, such as the customer's wireless telephone. The message will typically be addressed to the customer's automatic numbering identification ("ANI") that was received with the customer's call. The message passed to the customer will include the destination telephone number and may include further identification data such as the name and/or address of the destination party.

The second service allows a caller to leave a message for a currently-unreachable destination party. Voice server 120*b* records the message provided by the caller and, at configurable time intervals in the future, attempts to connect to the destination telephone. When a successful connection is established, the message is delivered. In a present embodiment, if the successful connection is to a live person or an answering service, the answering person will be informed that a message exists for a specified destination party and will be requested to press a particular key to receive the message. After playing the message, it may be played again. In this embodiment, if the successful connection is to an answering machine, the message will be played for the machine to record, thus allowing the destination party to easily retrieve it.

In an alternative embodiment of this service, the destination party will be required to call directory assistance system 100 to retrieve the message left for that party by the original caller. The party must enter an access code to retrieve the message, thus ensuring that private messages are adequately protected. If delivery or notification of the stored message is attempted for a predetermined number of times without success, the message will be deleted and the failed delivery attempt will be noted.

The third service of particular interest enables a destination party to return a calling party's call via a single keypress, and has particular value when used in conjunction with the second service. In such a combination, after voice server 120*b* plays the message for the destination party, the destination party may press a specified key to initiate a call to the original caller. Voice server 120*b* will handle this as a normal outgoing call.

Method of Operation

One method of implementing the present invention is depicted in FIGS. 4A–4E. As an initial process, switch host computer 106 is programmed at step 400 with instructions for configuring and operating telephone switch 104 in accordance with the present invention. The instructions are loaded in computer-readable form, as is known in the art.

A directory assistance call is received (step 402) by directory assistance system 100 at T1 interface 230 of telephone switch 104 via inbound communication channel 102*a*. A directory assistance call may originate at virtually any telephone, whether wireless, portable, or stationary. In receiving the call, directory assistance system 100 also receives data concerning the caller's identity, such as the caller's ANI, and the area of the call's origination, such as the originating cell site. This information is used, as described below, to verify that the customer is authorized to connect to the desired destination party via directory assistance system 100.

Switch host computer 106 and data server 120*a* commence (step 404) the collection of call data, starting with the information listed immediately above. The call data is updated as directory assistance system 100 takes action on behalf of the caller. Therefore, when a caller makes successive assistance requests, the directory assistance provider (i.e., a live operator or voice server 120*b*) called upon to satisfy each subsequent request can refer to information concerning the caller's connection to directory assistance system 100 and the information provided in response to the caller's previous requests.

Switch host computer 106 determines (step 406) whether any directory assistance operators are available. If no operators are immediately available, and the caller has not already been waiting (step 408) for an operator, CPG 212 generates (step 410) a ringback tone across T1 interface 230 to inform the calling customer that his or her call is being queued to await an available operator. Waiting calls are then placed (step 412) into an automatic call distribution queue ("ACDQ"), which is maintained by switch host computer 106 and constructed such that queued calls are routed to available operators in the order in which they were received. When one or more operators are available (step 406), a queued call, or if no calls are queued then a new call, is connected (step 414) to an available operator by switch 104 through EXCPU/MXCPU 204 and operator channel 112. In one embodiment of the invention, calls that are returned to an ACDQ due to an unsuccessful attempt to complete an outgoing call are placed into a separate ACDQ that has a higher priority than the ACDQ that holds new calls.

Once connected to an operator, a greeting message is played (step 416) for the caller. In illustrative embodiments, the message may be live from an operator or recorded (in the voice of the operator to whom the call is connected) and played back by voice server 120b. Switch host computer 106 directs the playback of recorded messages from voice server 120b by identifying the inbound channel 102a and the operator with which the caller is connected and specifying the message that voice server 120b is to play.

The caller typically then states (step 418) his or her directory assistance request by identifying, as far as he or she is able, the destination party he or she wishes to contact. The operator searches databases of information (e.g., listings of private individuals and businesses), stored on data servers 120a, for the appropriate destination telephone number. Database records matching the caller's query may be displayed on the inquiring operator's data terminal 118 in a variety of formats, such as alphabetical, random, etc. The operator retrieves (step 420) the information most closely matching the caller's request.

Based on the destination telephone number retrieved by the operator, the caller identification information received with the call by directory assistance system 100, and call authorization data stored on data servers 120a, the operating software on the data servers attempts to verify (step 422) the caller's authorization to connect to the destination telephone number through directory assistance system 100. For example, a caller may not be authorized to make long-distance telephone calls on his or her account. When such a caller connects to directory assistance system 100 from his or her home local calling area, the software simply determines whether the caller is trying to call a destination telephone number outside of the caller's local calling area. If, however, the caller is connected to directory assistance system 100 from a calling area outside of his or her home local calling area, the software uses the ANI received with the call, as well as the destination telephone number, to determine whether the caller is attempting to place a long-distance call.

If the caller is not authorized (step 422) to make the requested call through directory assistance system 100, the caller will merely be provided with the destination telephone number (step 424). Additionally, the caller may only be authorized to receive information from directory assistance system 100 (i.e., he or she may not place any calls through the system). In this situation, the caller could never advance further than step 424.

If, however, authorization is verified (step 422), the operator initiates an outgoing call for the caller by seizing (step 426) outgoing communication channel 102b from T1 interface 230 and outdialing (step 428) the destination telephone number outdialing is a function of telephone switch 104, whereby switch 104 transmits the destination telephone number after it is entered. Entry of the destination telephone number may be done manually by an operator (i.e., the operator keys the number in via operator telephone 116) or automatically by data server 120a (i.e., data server 120a delivers the destination telephone number to switch 104 after the number is identified by the operator).

Switch host computer 106 is notified of the outgoing call and automatically instructs telephone switch 104 to apply (step 430) CPA 218 to outbound channel 102b and DTMF receiver 214 to inbound channel 102a after outdialing. Although a plurality of the programmable DSPs on MFDSP unit 210 are allocated and configured as CPAs and DTMF receivers, they remain in a quiescent state until assigned to an outbound channel. Telephone switch 104 then connects (step 432) the calling customer on inbound channel 102a to the outgoing call on outbound channel 102b.

CPA 218 monitors the outgoing call on outbound channel 102b for a predetermined number of rings, a predetermined amount of time, or until a specified connection status is detected. A successful call, in which the destination telephone is answered, is recognized by T1 interface 230 of switch 104. Illustratively, T1 interface 230 identifies a successful call by detecting, on outbound channel 102b, the bit transition that occurs when the destination telephone converts from an on-hook status to an off-hook status. The detection of a successful call is relayed to switch host computer 106 by switch 104. In one telephone switch according to the invention, T1 interface 230 first notifies EXCPU/MXCPU 204 of the successful call via TDM midplane 202. EXCPU/MXCPU 204 in turn notifies switch host computer 106 via switch data link 108.

When an outgoing call is successfully completed (step 434), directory assistance system 100 remains passively connected to the call. When the destination telephone is disconnected (step 440), T1 interface 230 detects another bit transition indicating that the destination telephone changed from off-hook to on-hook, and switch 104 drops (step 442) CPA 218 and DTMF receiver 214.

If and when the customer disconnects (step 444), whether before or after the called party disconnects, the customer's call is broken down and the connection between the customer and directory assistance system 100 is terminated. If the caller does not disconnect from directory assistance system 100 within a configurable period of time after the called party disconnects, voice server 120b is connected (step 446) to the caller via voice server link 124. Voice server 120b, utilizing the capabilities of voice card 302, then commences (step 448) its own DTMF detection and, substantially simultaneously, presents (step 450). The caller with an audio menu of selected directory assistance options. The caller selects (step 452) an option by pressing the specified key, illustratively, the '#' key to hear (step 454) a recitation of the destination telephone number, the '*' key to be connected (step 456) to a live operator at operator position 114, or the '7' key to have directory assistance system 100 convey the destination telephone number to the caller by transmitting (step 458) it to the caller's alphanumeric pager or telephone. The customer's input is detected and identified by voice card 302. Voice server 120b performs the corresponding function, after which the caller may disconnect or return to step 450.

If, however, the call is unsuccessful (step 434), CPA 218 will detect (step 460) a telephone connection status condition such as ring tone, busy, reorder, PBX intercept, SIT intercept, vacant code, reorder-SIT, no circuit LEC, reorder-carrier, no circuit-carrier, dial tone, continuous on tone, or silence. Telephone switch 104 identifies (step 462) the condition and notifies switch host computer 106. Subsequent action depends upon which connection status condition was detected.

Busy Signal

If the detected condition is identified as a busy signal (step 462), telephone switch 104 drops (step 480) CPA 218 and DTMF receiver 214 from outbound channel 102*b* and inbound channel 102*a*, respectively, then terminates (step 482) the outgoing call by releasing outbound channel 102*b*. Switch 104 then transfers (step 484) the caller to voice server 120*b* so that the caller can receive automated directory assistance. In order to transfer control of a call to voice server 120*b*, telephone switch 104 connects inbound channel 102*a* to voice server link 124. As opposed to directory assistance systems in which a voice response unit ("VRU"), operating under the control of a switch host computer, is merely conferenced or bridged onto a caller's connection with a switch or called parties, in the present embodiment of the invention not only does the voice server connect to the customer's call into directory assistance system 100, it also takes control over the customer's call. In order to route a call back to switch 104, either for transfer to a live operator or to re-dial a destination telephone number, voice server 120*b* simply sends a specified message to switch host computer 106 via data network 122 identifying which inbound channel the caller is on. Switch host computer 106 the instructs switch 104 to direct the new call attempt.

Along with the caller's connection, voice server 120*b* receives (step 486) the associated call data, described above, from switch host computer 106 and data servers 120*a* over data network 122. Voice server 120*b* then plays (step 488) a message to the caller, explaining that the destination telephone is busy, and initiates(step 490) DTMF detection on inbound channel 102*a*, using voice card 302, in order to detect keys pressed by the caller.

Voice server 120*b* presents (step 492) the caller with an audio menu offering several directory assistance options. The caller chooses (step 494) one by pressing the specified key, illustratively, the '#' key to have voice server 120*b* recite (step 496) the dialed telephone number, the '*' key to transfer (step 498) the caller to a live operator, the '1' key to record (step 500) a message for later delivery to the destination party, the '2' key to transfer (step 502) the call back to switch 104 and attempt the same destination telephone number again (by resuming operation at step 424), or the '7' key to receive (step 504) the destination telephone number via the caller's alphanumeric pager or telephone. The caller's selection may, alternatively, be spoken into the caller's telephone and received by a voice recognition subsystem associated with, or contained within, voice server 120*b*. Unless the caller disconnected from directory assistance system 100, transferred, or recorded a message for later delivery, voice server 120*b* will automatically return to step 492 after performing the requested function. For the times when a caller records a message for delivery to the destination party, voice server 120*b* can be configured to either return the caller to step 492 or terminate the caller's connection. If the caller chooses to transfer to a live operator, telephone switch 104 takes control of the call from voice server 120*b*. If no operators are currently available, the caller hears a ringback tone generated by CPG 212 and is placed into an ACDQ, as explained above.

When a directory assistance-connected caller is rerouted to a live operator after an unsuccessful call attempt, regardless of what connection status condition was encountered, the live operator receives substantially the same call data as voice server 120*b* did in step 486.

Ring-No-Answer Condition

When a ring-no-answer condition is detected (step 462), it is desirable to allow sufficient time for the called party to answer the call, but yet also provide the calling party with options other than simply waiting continuously for an answer. After telephone switch 104 drops (step 510) CPA 218 and DTMF receiver 214, it transfers (step 512) the call to voice server 120*b*, as described above in response to the receipt of a busy signal. The ring tone received over outbound channel 102*b* is muted (step 514), and voice server 120*b* receives (step 516) the associated call data from switch host 106 and data servers 120*a*. Voice server 120*b* then initiates (step 518) its own DTMF detection, via voice card 302, in place of the counterparts dropped by switch 104 and presents (step 520) the caller with an audio menu.

The audio menu presented in response to a ring-no-answer condition is similar to that offered after a busy signal. The caller selects (step 522) an option by pressing the specified key, illustratively, the '#' key to have voice server 120*b* recite (step 524) the dialed telephone number, the '*' key to transfer (step 526) the caller to a live operator, the '1' key to continue monitoring (step 528) the outbound connection for an answer by the destination party, the '2' key to record (step 530) a message for later delivery to the destination party, or the '7' key to receive (step 532) the destination telephone number via the caller's alphanumeric pager or telephone. The caller's selection may, alternatively, be spoken into the caller's telephone and received by a voice recognition subsystem associate with, or contained within, voice server 120*b*. Unless the caller disconnected from directory assistance system 100, transferred, chose to continue monitoring outbound channel 102*b*, or recorded a message for later delivery, voice server 120*b* will automatically return to step 520 after performing the requested function. When a caller records a message for delivery to the destination party, voice server 120*b* can be configured to either return the caller to step 520 or terminate the caller's connection. If the caller chooses to transfer to a live operator, telephone switch 104 takes control of the call from voice server 120*b*. If no operators are currently available, the caller hears a ringback tone generated by CPG 212 and is placed into an ACDQ, as explained above.

If the caller chooses the option of returning to the ring tone, voice card 302 maintains its DTMF detection in order to allow the caller to connect to a live operator by pressing the '*' key. Unless the destination telephone is answered or the '*' key is pressed, directory assistance system 100 simply maintains the ringing outbound connection until the caller disconnects.

If the called party answers the telephone after the call is transferred (step 512) to voice server 120*b*, T1 interface 230 in switch 104 detects a bit transition on outbound channel 102*b*, as described above. Switch 104 then takes control of the call, terminates the connection to voice server 120*b* over voice server link 124, and the caller and the called party are connected.

Network Communication Failure

Connection status conditions such as reorder, PBX intercept, SIT intercept, vacant code, reorder-SIT, no circuit LEC, reorder-carrier, no circuit-carrier, dial tone, continuous on tone, and silence indicate a communication problem in the telephone network. In the event that one of these conditions is identified (step 462), subsequent action is quite different from when a busy signal or ring-no-answer condition is detected. Specifically, telephone switch 104 drops (step 464) CPA 218 and DTMF receiver 214 and releases (step 466) outbound channel 102*b*. Voice server 120*b* is connected (step 468) to the caller, receives (step 470) the associated call data, and informs (step 472) the caller that a network problem was encountered. The caller is then transferred (step 474) to a live operator at operator position 114 and hears (step 476) a return greeting message played by voice server 120*b*. Note that the caller was not required to take any action to be reconnected to a live operator; directory assistance system 100 automatically took the necessary action. Subsequent activity resumes at step 418.

Various embodiments of the invention have been described. The descriptions are intended to be illustrative, not limitative. Thus, it will be apparent to those skilled in the art that modifications may be made to the invention as described without departing from the scope of the claims set out below.

We claim:

1. A method of providing directory assistance services to a customer, comprising:

receiving a call from the customer on an inbound channel;

eliciting a directory assistance request from the customer;

searching a database containing telephone numbers for search results including a destination telephone number that satisfies the directory assistance request;

allocating an outbound channel for attempting to establish a connection to a destination telephone associated with the destination telephone number;

monitoring the outbound channel using a signal processing device;

detecting a connection status signal on the outbound channel before the destination telephone answers;

analyzing by the signal processing device the connection status signal to determine if the connection status signal indicates a network communication problem; and when it is determined that the communication status signal indicates a network communication problem, automatically connecting the customer to a directory assistance provider, and offering a selected service to the customer.

2. The method of claim 1 further comprising applying a DTMF detector to the inbound channel to detect customer input.

3. The method of claim 2 wherein the DTMF detector is applied until the customer disconnects.

4. The method of claim 1 wherein the call is originated from a wireless telephone.

5. The method of claim 1 further comprising:

receiving call origination data on the inbound channel; and verifying the authority of the customer in attempting to establish a connection to the destination telephone.

6. The method of claim 1 further comprising terminating the attempt to establish a connection to the destination telephone before connecting the customer to the directory assistance provider.

7. The method of claim 1 further comprising informing the customer of the network communication problem before connecting the customer to the directory assistance provider.

8. The method of claim 1 further comprising:

placing the call into a call distribution system before connecting the customer to the directory assistance provider, the directory assistance provider being specified by the call distribution system.

9. The method of claim 8 wherein the call is placed into the call distribution system with an assigned priority.

10. The method of claim 1 wherein the selected service includes conveying the destination telephone number to the customer.

11. The method of claim 1 wherein the selected service includes transmitting the destination telephone number to the customer's alphanumeric communication device.

12. The method of claim 1 wherein the selected service includes transferring the customer to an operator.

13. The method of claim 1 wherein the selected service includes recording a message to be delivered to a destination party associated with the destination telephone number.

14. The method of claim 1 wherein the directory assistance provider includes an operator.

15. The method of claim 1 wherein the directory assistance provider includes a voice server.

16. A method of providing directory assistance services to a customer, comprising:

receiving a call from the customer on an inbound channel;

eliciting a directory assistance request from the customer;

searching a database containing telephone numbers for search results including a destination telephone number that satisfies the directory assistance request;

allocating an outbound channel for attempting to establish a connection to a destination telephone associated with the destination telephone number;

monitoring the outbound channel using a signal processing device;

detecting a connection status six on the outbound channel;

analyzing by the signal processing device the connection status signal to determine whether the connection status signal is a ring-no-answer signal; and when it is determined that the connection status signal is a ring-no-answer signal, automatically transferring the customer to a directory assistance provider while continuing the attempt to establish a connection to the destination telephone over the outbound channel and continuing to monitor the outbound channel using the signal processing device.

17. The method of claim 16 further comprising applying a DTMF detector to the inbound channel to detect customer input.

18. The method of claim 17 wherein the DTMF detector is applied until the customer disconnects.

19. The method of claim 16 wherein the call is originated from a wireless telephone.

20. The method of claim 16 further comprising:

receiving call origination data on the inbound channel; and verifying the authority of the customer in attempting to establish a connection to the destination telephone.

21. The method of claim 16 further comprising providing the directory assistance provider with the search results.

22. The method of claim 16 further comprising presenting the customer with a menu of directory assistance options, wherein the menu of directory assistance options includes one or more of the following:

conveying the destination telephone number to the customer;

transmitting the destination telephone number to the customer's alphanumeric communication device;

transferring the customer to a directory assistance operator;

continuing to monitor the outbound channel using the signal processing device; and recording a message to be delivered to a destination party associated with the destination telephone number.

23. The method of claim 16 wherein the directory assistance provider includes an operator.

24. The method of claim 16 wherein the directory assistance provider includes a voice server.

25. A method of providing directory assistance services to a customer, comprising:

receiving a call from the customer on an inbound channel;

eliciting a directory assistance request from the customer;

searching a database containing telephone numbers for search results including a destination telephone number that satisfies the directory assistance request;

allocating an outbound channel for attempting to establish a connection to a destination telephone associated with the destination telephone number;

monitoring the outbound channel using a signal processing device;

detecting a connection status signal on the outbound channel;

analyzing by the signal processing device the connection status signal to determine whether the connection status signal is a busy signal; and when it is determined that the detected connection status signal is a busy signal, terminating the connection attempt to the destination telephone over the outbound channel, automatically transferring the customer to a directory assistance provider, and offering a selected service to the customer.

26. The method of claim 25 further comprising applying a DTMF detector to the inbound channel to detect customer input.

27. The method of claim 26 wherein the DTMF detector is applied until the customer disconnects.

28. The method of claim 25 wherein the call is originated from a wireless telephone.

29. The method of claim 25 further comprising:

receiving call origination data on the inbound channel; and verifying the authority of the customer in attempting to establish a connection to the destination telephone.

30. The method of claim 25 further comprising providing the directory assistance provider with the search results.

31. The method of claim 25 wherein the selected service includes conveying the destination telephone number to the customer.

32. The method of claim 25 wherein the selected service includes transmitting the destination telephone number to the customer's alphanumeric communication device.

33. The method of claim 25 wherein the selected service includes transferring the customer to an operator.

34. The method of claim 25 wherein the selected service includes recording a message to be delivered to a destination party associated with the destination telephone number.

35. The method of claim 25 wherein the directory assistance provider includes an operator.

36. The method of claim 25 wherein the directory assistance provider includes a voice server.

37. A method of providing directory assistance services to a customer comprising:

receiving a call from the customer on an inbound channel;

eliciting a directory assistance request from the customer;

searching a database containing telephone numbers for search results including a destination telephone number that satisfies the directory assistance request;

verifying the authority of the customer to attempt to establish a connection to the destination telephone;

retrieving the destination telephone number from the database;

allocating an outbound channel for attempting to establish a connection to a destination telephone associated with the destination telephone number;

outdialing the destination telephone number; analyzing communication on the outbound channel using a signal processing device;

detecting a connection status condition on the outbound channel, the connection status condition indicating a network communication problem; and automatically connecting the customer to a directory assistance provider and offering a selected service to the customer after detection of the connection status condition.

38. The method of claim 37 further comprising applying a DTMF detector to the inbound channel to detect customer input.

39. The method of claim 37 wherein the call is originated from a wireless phone.

40. The method of claim 37 wherein the directory assistance provider includes a voice server.

41. The method of claim 40 further comprising presenting the customer by the voice server with a menu of directory assistance options.

42. The method of claim 37 further comprising informing the customer of the network communication problem.

43. The method of claim 37 further comprising:

upon a successful connection attempt to the destination telephone, connecting the customer to a voice server;

presenting the customer with a menu of directory assistance options; and monitoring the inbound channel with a DTMF detector for a customer input.

44. The method of claim 37 further comprising placing the call into a call distribution system before connecting the customer to the directory assistance provider, the directory assistance provider being specified by the call distribution system.

45. The method of claim 44 wherein the call is placed into the call distribution system with an assigned priority.

46. The method of claim 37 further comprising presenting the customer with a menu of directory assistance options when the customer is connected to the directory assistance provider, said menu including one or more of the following options:

conveying the destination telephone number to the customer;

transferring the customer to a directory assistance operator;

transmitting the destination telephone number to the customer's alphanumeric communication device;

continuing to monitor the outbound channel with the signal processing device; and recording a message to be delivered to a destination party associated with the destination telephone number.

47. A directory assistance system for providing directory assistance services to a customer caller, comprising:

a plurality of inbound channels for receiving customer calls;

a plurality of outbound channels for attempting to establish connections to destination telephones;

a switch platform having at least one signal processing device for analyzing and detecting connection status conditions of network communication problems on the plurality of outbound channels; and a server for searching directory assistance databases for search results including destination telephone numbers that satisfy directory assistance requests, the switch platform automatically connecting a customer call on an inbound channel to a directory assistance provider offering a selected service to a caller of the customer call after detection, by the signal processing device, of a connection status condition of a network communication problem.

48. The directory assistance system of claim 47 further comprising a DTMF detector for monitoring and detecting customer input on the inbound channel.

49. The directory assistance system of claim 47 further comprising:

a memory for storing the search results; and a transport for transferring the search results to the directory assistance provider.

50. A directory assistance system for providing directory assistance access to a customer caller, comprising:

a plurality of inbound channels for receiving customer calls;

a plurality of outbound channels for attempting to establish connections to destination telephones;

a switch platform having at least one signal processing device for analyzing and detecting connection status conditions of ring-no-answer on the plurality of outbound channels; and a server for searching directory assistance databases for search results including destination telephone numbers that satisfy directory assistance requests, the switch platform automatically connecting a customer call on an inbound channel to a directory assistance provider upon detection by the signal processing device of a ring-no-answer connection status condition on an outbound channel, the signal processing device continuing to monitor the outbound channel after the customer call is connected to the directory assistance provider.

51. The directory assistance system of claim 50 further comprising a DTMF detector for monitoring and detecting customer input on the inbound channel.

52. The directory assistance system of claim 50 further comprising:

a memory for storing the search results; and a transport for transferring the search results to the directory assistance provider.

53. A directory assistance system for providing directory assistance services to a customer caller, comprising:

a plurality of inbound channels for receiving customer calls;

a plurality of outbound channels for attempting to establish connections to destination telephones;

a switch platform having at least one signal processing device for analyzing and detecting busy signals on the plurality of outbound channels; and a server for searching directory assistance databases for search results including destination telephone numbers that satisfy directory assistance requests, the switch platform automatically connecting a customer call on an inbound channel to a directory assistance provider offering a selected service to a caller of the customer call upon detection, by the signal processing device, of a busy signal.

54. The directory assistance system of claim 53 further comprising a DTMF detector for monitoring and detecting customer input on the inbound channel.

55. The directory assistance system of claim 53 further comprising:

a memory for storing the search results; and a transport for transferring the search results to the directory assistance provider.

56. A method of providing directory assistance services to a customer caller, comprising:

receiving a call from the customer caller on an inbound channel;

allocating an outbound channel for communications with a destination telephone associated with a destination telephone number;

connecting the inbound channel with the outbound channel to establish a connection connecting the custom caller's call to the destination telephone;

monitoring the connection after the customer caller's call is connected to the destination telephone;

detecting a disconnection of the destination telephone from the connection;

monitoring the inbound channel for a period of time after the destination telephone disconnects; and if the customer caller does not disconnect within the period of time after the destination telephone disconnects, automatically connecting the customer caller to a directory assistance provider.

57. The method of claim 56 wherein the disconnection of the destination telephone is detected by detecting a bit transition indicating that the destination telephone went from an off-hook status to an on-hook status.

58. The method of claim 56 wherein the directory assistance provider includes an operator.

59. The method of claim 56 wherein the directory assistance provider includes a voice server.

60. The method of claim 56 further comprising providing, by the directory assistance provider, the customer caller with selected directory assistance options.

61. The method of claim 56 further comprising the directory assistance provider offering a service to the customer caller, wherein the service comprises communicating the destination telephone number to the customer caller.

62. The method of claim 59 further comprising the directory assistance provider offering a service to the customer caller, wherein the service comprises the voice server communicating the destination telephone number to the customer caller.

* * * * *

UNITED STATES PATENT AND TRADEMARK OFFICE
CERTIFICATE OF CORRECTION

PATENT NO. : 6,456,709 B1
DATED : September 24, 2002
INVENTOR(S) : Cox et al.

It is certified that error appears in the above-identified patent and that said Letters Patent is hereby corrected as shown below:

Column 16,
Line 32, after "status", replace "six" with -- signal --.

Column 20,
Line 25, after "connecting the", replace "custom" with -- customer --.

Signed and Sealed this

Sixteenth Day of November, 2004

JON W. DUDAS
*Director of the United States Patent and Trademark Office*